(12) United States Patent
Endo

(10) Patent No.: US 11,840,480 B2
(45) Date of Patent: Dec. 12, 2023

(54) OPTICAL GLASS, OPTICAL ELEMENT, OPTICAL DEVICE, METHOD FOR PRODUCING OPTICAL GLASS, AND METHOD FOR PRODUCING OPTICAL ELEMENT

(71) Applicant: CANON KABUSHIKI KAISHA, Tokyo (JP)

(72) Inventor: Michio Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 17/088,216

(22) Filed: Nov. 3, 2020

(65) Prior Publication Data

US 2021/0047231 A1 Feb. 18, 2021

Related U.S. Application Data

(63) Continuation of application No. PCT/JP2019/017016, filed on Apr. 22, 2019.

(30) Foreign Application Priority Data

May 11, 2018 (JP) ................................ 2018-092539

(51) Int. Cl.
*C03C 3/155* (2006.01)
*C03B 11/08* (2006.01)

(52) U.S. Cl.
CPC ............ *C03C 3/155* (2013.01); *C03B 11/084* (2013.01); *C03B 2215/24* (2013.01)

(58) Field of Classification Search
CPC ......... C03C 3/155; C03C 3/142; C03B 11/08; C03B 11/084; C03B 11/086; C03B 2215/24

See application file for complete search history.

(56) References Cited

U.S. PATENT DOCUMENTS

2011/0065564 A1\* 3/2011 Fu .............................. C03C 3/14
501/51
2014/0287906 A1 9/2014 Kuang

FOREIGN PATENT DOCUMENTS

| CN | 103930383 A | 7/2014 |
|----|-------------|--------|
| CN | 104030562 A | 9/2014 |
| CN | 104136388 A | 11/2014 |
| CN | 105793205 A | 7/2016 |
| CN | 105884188 A | 8/2016 |
| CN | 107021620 A | 8/2017 |
| JP | 2006-219365 A | 8/2006 |
| JP | 2014-196236 A | 10/2014 |
| JP | 2016-199408 A | 12/2016 |
| JP | 2018-020935 A | 2/2018 |
| JP | 2018-035037 A | 3/2018 |
| JP | 2018-135252 A | 8/2018 |

OTHER PUBLICATIONS

Technical Requirements for Optical Elements, Instrument Industry Bureau of Ministry of Machine-Building Industry, Jan. 31, 1984, China Machine Press, p. 38.

\* cited by examiner

*Primary Examiner* — Elizabeth A. Bolden
(74) *Attorney, Agent, or Firm* — Canon U.S.A., Inc., IP Division

(57) ABSTRACT

Provided is an optical glass containing glass-forming cations, the optical glass satisfying, expressed in cation percent, 10 cat %$\leq B^{3+} \leq$50 cat %, 15 cat %$\leq La^{3+} \leq$35 cat %, 20 cat %$\leq Nb^{5+} \leq$50 cat %, and 15 cat %$\leq Ti^{4+} \leq$25 cat %.

16 Claims, 7 Drawing Sheets

OPTICAL GLASS, OPTICAL ELEMENT, OPTICAL DEVICE, METHOD FOR PRODUCING OPTICAL GLASS, AND METHOD FOR PRODUCING OPTICAL ELEMENT

CROSS-REFERENCE TO RELATED APPLICATIONS

This application is a Continuation of International Patent Application No. PCT/JP2019/017016, filed Apr. 22, 2019, which claims the benefit of Japanese Patent Application No. 2018-092539, filed May 11, 2018, both of which are hereby incorporated by reference herein in their entirety.

BACKGROUND OF THE INVENTION

Field of the Invention

The present invention relates to an optical glass containing a rare-earth element, such as $La_2O_3$, $B_2O_3$, $Nb_2O_5$, and $TiO_2$ as essential components, an optical lens obtained by molding the optical glass, and methods for producing the optical glass and the optical element.

Background Art

Typically, high-refractive-index, high-dispersion glasses are produced by containing network-forming oxides typified, for example, by $SiO_2$, $B_2O_3$, and $P_2O_5$ and network-modifying oxides or intermediate oxides, such as $Nb_2O_5$ and $TiO_2$, which provide high refractive indices and high dispersions. Here, $Nb_2O_5$ and $TiO_2$ have absorption edges near the visible light and thus provide high refractive indices and high dispersions. In the case of producing a high-refractive-index, high-dispersion glass, the network-forming oxides, which provide low-refractive-indices and low-dispersions, are replaced with $Nb_2O_5$ and $TiO_2$ to increase the relative proportions of $TiO_2$ and $Nb_2O_5$, thereby producing a high-refractive-index, high-dispersion glass. As described above, in the case where the proportions of the network-forming oxides are decreased and where the network-modifying oxide, such as $Nb_2O_5$, or the intermediate oxide, such as $TiO_2$, is increased, the glass is unstable and crystallizes easily. Additionally, $TiO_2$ and $Nb_2O_5$ are easily reduced. As the total amount thereof increases, transfer failure is more likely to occur because in a glass molding process in which the glass is molded with a mold under heat into a lens, oxygen in the glass reacts with the mold to generate a gas. The following have been taken as measures against the transfer failure: to decrease the amount of ions that are easily reduced; and to suppress the reaction between the mold and the glass by lowering the heating temperature of the mold in the glass molding process.

PTL1 discloses a $B_2O_3$—$La_2O_3$—$Nb_2O_5$-based glass. PTL2 discloses a $La_2O_3$—$TiO_2$—$Ta_2O_5$-based glass.

CITATION LIST

Patent Literature

PTL1: Japanese Patent Laid-Open No. 2014-196236
PTL2: Japanese Patent Laid-Open No. 2016-199408

PTL1 discloses a high-refractive-index, low-dispersion optical glass composed of $B_2O_3$—$La_2O_3$—$Nb_2O_5$ as basic components. However, PTL1 does not disclose a glass having a high refractive index and a low glass transition temperature. The high-refractive-index glass described in PTL1 has a high glass transition temperature. Thus, in the case where a lens or the like is produced by glass molding, the temperature in a heat molding step is high. This disadvantageously results in the occurrence of the reaction between the glass and a mold, thereby easily causing transfer failure.

PTL2 discloses a high-refractive-index, high-dispersion glass composed of $La_2O_3$—$TiO_2$—$Ta_2O_5$ as basic components. However, PTL 2 does not disclose a glass having a low glass transition temperature. Additionally, the glass disclosed in PTL2 contains a large amount of $Ti^{4+}$, which is easily reduced. Thus, in a glass molding process, the glass disadvantageously reacts with a mold to generate a gas, thereby easily causing transfer failure.

The present invention has been accomplished in view of the foregoing background art. An optical glass of the present invention is an optical glass containing a rare-earth element, such as $La_2O_3$, $B_2O_3$, $Nb_2O_5$, and $TiO_2$ as essential components. It is an object of the present invention to provide an optical glass that has a high refractive index and a low glass transition temperature and that is less likely to cause transfer failure when used as a preform in glass molding.

SUMMARY OF THE INVENTION

An optical glass of the present invention contains glass-forming cations and satisfies, expressed in cation percent, 10 cat %≤$B^{3+}$≤50 cat %, 15 cat %≤$La^{3+}$≤35 cat %, 20 cat %≤$Nb^{5+}$≤50 cat %, and 15 cat %≤$Ti^{4+}$≤25 cat %.

An optical element of the present invention contains the foregoing optical glass that is molded.

A method for producing an optical glass according to the present invention is a method for producing an optical glass using a containerless solidification method and includes the steps of levitating a glass material with a levitation gas, the glass material satisfying the foregoing composition, expressed in cation percent, of the optical glass, heating and melting the levitated glass material to form a melt, and cooling and solidifying the melt in a levitated state.

A method for producing an optical element according to the present invention includes the steps of providing a lens preform of an optical glass having the foregoing composition, press-molding the heated lens preform with a mold member, and releasing the molded lens preform from the mold member to form an optical lens.

Further features of the present invention will become apparent from the following description of exemplary embodiments with reference to the attached drawings.

DESCRIPTION OF THE EMBODIMENTS

Figure 1:
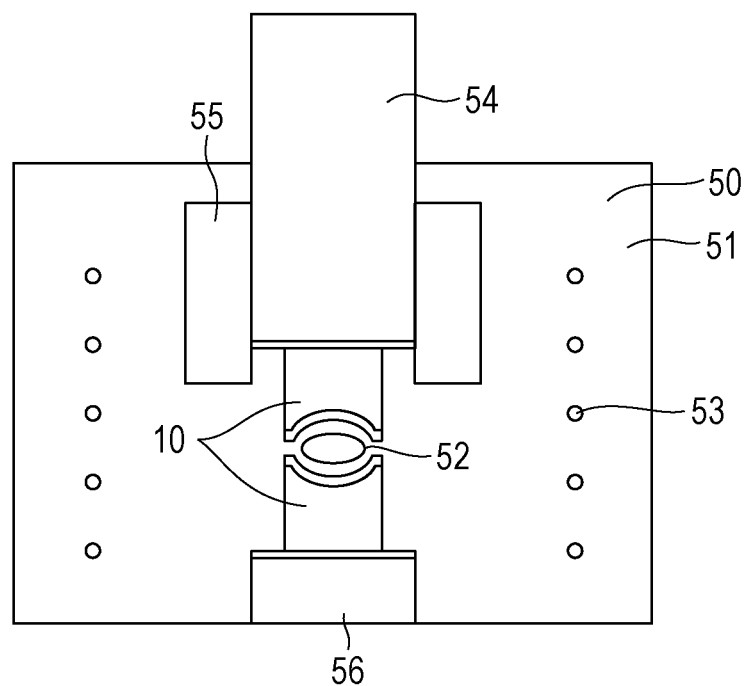
FIG. 1 is a schematic view of a molding machine used for the production of an optical lens of the present invention.

The present invention will be described in detail below.
(Optical Glass)

An optical glass of the present invention is a glass containing, as cation components, $B^{3+}$, rare-earth ions, such as $La^{3+}$, $Nb^{5+}$, and $Ti^{4+}$ ions. The glass of the present invention is a glass having a high refractive index, a high dispersion, and a low glass transition temperature.

The glass of the present invention contains $B^{3+}$ in an amount of 10 cat % or more and 50 cat % or less (expressed in cation percent) with respect to the total cations contained in the glass. $B^{3+}$ has a low optical basicity $B_i$ of 0.028 and does not easily release oxygen.

The optical basicity B is defined as described below. The $M_i$-O bonding strength of an oxide $M_iO$ is represented by formula (1) below when cation-oxygen ion attraction is denoted by $A_i$, where is the number of $M_i$ ions, $Z_{O2-}$ is the valence of oxygen ions, $r_i$ is the ionic radius of an $M_i$ ion, and $r_{O2-}$ is the ionic radius of an oxygen ion.

[Math. 1]
$$A_i = \frac{Z_i \cdot Z_{O2-}}{(r_i + r_{O2-})^2} = \frac{Z_i \cdot 2}{(r_i + 1.40)^2} \quad (1)$$

The reciprocal of $A_i$ ($1/A_i$) in formula (2) below is defined as $B_i$, which is the oxygen supply capacity of the constituent oxide $M_iO$.

[Math. 2]
$$B_i \equiv \frac{1}{A_i} \quad (2)$$

$B_i$ is normalized with CaO=1 and SiO2=0 to obtain B.

In glass molding in which an optical glass is heated to a high temperature to soften, poured into a mold (shaping mold), and press-molded, oxygen ions in the glass react with the mold to generate a gas, thereby causing transfer failure. The optical glass of the present invention contains $B^{3+}$ in an amount of 10 cat % or more and 50 cat % or less. It is thus possible to suppress transfer failure when an optical lens is produced by glass molding. At a $B^{3+}$ content of less than 10 cat %, it is difficult to form glass, and transfer failure is easy to occur when a lens is produced by glass molding. At a $B^{3+}$ content of more than 50 cat %, the refractive index is low, a high-refractive-index, high-dispersion glass is not formed.

The optical glass of the present invention preferably contains $B^{3+}$ in an amount of 20 cat % or more and 50 cat % or less.

The optical glass of the present invention contains $La^{3+}$ in an amount of 15 cat % or more and 35 cat % or less. Rare-earth ions, such as $La^{3+}$ ($La^{3+}$, $Y^{3+}$, $Gd^{3+}$, $Lu^{3+}$, and $Yb^{3+}$), seem to have the same function as the network-forming components. When the amount of rare-earth ions such as $La^{3+}$ contained is less than 15 cat %, it is difficult to form glass. When the amount of rare-earth ions such as $La^{3+}$ contained is more than 35 cat %, the dispersion is low, and a high-dispersion glass is not formed. Additionally, the glass transition temperature (Tg) is increased; thus, a high temperature is required when a lens is produced by glass molding. Here, $La^{3+}$ can be replaced with at least one or more rare-earth ions selected from $Y^{3+}$, $Gd^{3+}$, $Lu^{3+}$, and $Yb^3$. $La^{3+}$ can be replaced with $Y^{3+}$, $Lu^{3+}$, or $Yb^{3+}$ in an amount of 0 cat % or more and 10 cat % or less or with $Gd^{3+}$ in an amount of 0 cat % or more and 15 cat % or less. At an $Y^{3+}$, $Lu^{3+}$, or $Yb^{3+}$ content of more than 10 cat % or a $Gd^{3+}$ content of more than 15 cat %, the glass crystallizes.

The optical glass of the present invention contains $Nb^{5+}$ in an amount of 20 cat % or more and 50 cat % or less. $Nb^{5+}$ in the glass functions partially as a glass-network-forming component and, in particular, functions to provide a high refractive index and a high dispersion. At a $Nb^{5+}$ content of less than 20 cat %, a high-refractive-index glass is not formed. At a $Nb^{5+}$ content of more than 50 cat %, the glass is unstable and crystallizes (devitrifies).

The optical glass of the present invention contains $Ti^{4+}$ in an amount of 15 cat % or more and 25 cat % or less. $Ti^{4+}$ is an essential component that provides a high refractive index and a high dispersion. At a $Ti^{4+}$ content of less than 15 cat %, the glass is unstable and devitrifies. At a $Ti^{4+}$ content of more than 25 cat %, the glass has a higher glass transition temperature and is yellowish and decreased in transmittance.

The optical glass of the present invention can contain $Al^{3+}$ in an amount of 0 cat % or more and 5 cat % or less. $Al^{3+}$ increases the viscosity during melting to play the role of preventing devitrification. However, an $Al^{3+}$ content of more than 5 cat % results in a decrease in refractive index.

The optical glass of the present invention can contain $Ga^{3+}$ in an amount of 0 cat % or more and 5 cat % or less. $Ga^{3+}$ has the effect of promoting vitrification. However, at a $Ga^{3+}$ content of more than 5 cat %, the glass volatilizes easily. Thus, when a lens is produced by glass molding, transfer failure occurs easily.

The optical glass of the present invention can contain $Zn^{2+}$ in an amount of 0 cat % or more and 10 cat % or less. $Zn^{2+}$ is a component that has the effect of expanding the glass-forming region and reducing the glass transition temperature and that suppresses a decrease in refractive index. At a $Zn^{2+}$ content of more than 10 cat %, the glass is unstable and crystallize (devitrifies) easily. At a $Zn^{2+}$ content of more than 10 cat %, the viscosity is decreased during melting; thus, a large glass body is not easily formed. Additionally, the glass volatilizes easily; thus, when a lens is produced by glass molding, transfer failure occurs easily.

The optical glass of the present invention can contain $Ta^{5+}$ in an amount of 0 cat % or more and 15 cat % or less. $Ta^{5+}$ promotes vitrification and has the effect of providing a high refractive index. A $Ta^{5+}$ content of more than 15 cat %, the glass volatilizes easily. Thus, when a lens is produced by glass molding, transfer failure occurs easily.

The optical glass of the present invention may contain, in addition to the foregoing components, other components as long as the characteristics of a high refractive index, a high dispersion, colorlessness, and transparency are maintained. The optical glass can contain cations, such as $Si^{4+}$, $Ge^{4+}$, $Zr^{4+}$, $Li^+$, $Na^+$, $K^+$, $Mg^{2+}$, $Ca^{2+}$, $Sr^{2+}$, and $Ba^{2+}$, and anions, such as $F^-$ and $S^{2-}$.

The optical glass of the present invention preferably has a $Pb^{2+}$ content of 0 cat % or more and 3 cat % or less, more preferably 0 cat % or more and 1 cat % or less, even more preferably 0 cat %. At a $Pb^{2+}$ content of more than 3 cat %, when an optical glass is produced by a containerless solidification method, the viscosity during melting is decreased to allow the glass to adhere easily to a nozzle, thereby making it difficult to provide a large volume of glass.

The optical glass of the present invention preferably has a $W^{6+}$ content of 0 cat % or more and 3 cat % or less, more preferably 0 cat % or more and 1 cat % or less, even more preferably 0 cat %. $W^{6+}$ has the effects of providing a high refractive index and a high dispersion and decreasing the glass transition temperature. However, at a $W^{6+}$ content of more than 3 cat %, when a lens is produced by glass molding, the glass reacts with the mold to generate a gas because $W^{6+}$ is easily reduced; thus, transfer failure occurs easily.

Each of the $Bi^{3+}$, $Pb^{2+}$, and $Te^{2+}$ contents of the optical glass of the present invention is preferably 0 cat % or more and 3 cat % or less, more preferably 0 cat % or more and 1 cat % optical lens, even more preferably 0 cat %. $Bi^{3+}$, $Pb^{2+}$, and $Te^{2+}$ are effective in providing a high refractive index and a high dispersion but have absorption in the visible light region. Thus, the addition thereof tends to make the glass yellowish. When each of the $Bi^{3+}$, $Pb^{2+}$, and $Te^{2+}$ contents is more than 3 cat %, these ions are easily reduced and thus easily precipitated in the form of metal in the optical glass. When a lens is produced by glass molding, the glass reacts with the mold to generate a gas, thereby easily causing transfer failure.

In the optical glass of the present invention, the total amount of $B^{3+}$, $La^{3+}$, $Y^{3+}$, $Gd^{3+}$, $Lu^{3+}$, $Yb^3$, $Nb^{5+}$, and $Ti^{4+}$ is preferably 85 cat % or more and 100 cat % optical lens, more preferably 95 cat % or more and 100 cat % or less.

The optical lens of the present invention preferably has a refractive index of 2.07 or more and 2.31 or less and an Abbe number of 18 or more and 25 or less for the d line. The optical lens of the present invention preferably has a glass transition temperature (Tg) of 750° C. or lower, more preferably 730° C. or lower, even more preferably 710° C. or lower. When a glass has a high glass transition temperature (Tg), the glass is pressed at a high temperature. Thus, the reaction between the glass and the mold is promoted to easily generate bubbles.

(Optical Element)

The optical element of the present invention is obtained by molding the optical glass. In this specification, the optical element refers to an element included in an optical device, such as a lens, a prism, a reflector (mirror), or a diffraction grating.

(Optical Device)

The optical device of the present invention refers to a device including an optical system including an optical element of the present invention, such as binoculars, a microscope, a semiconductor exposure apparatus, or an interchangeable lens. Examples of the device including an optical system including the optical element of the present invention include camera systems, such as digital cameras and digital video cameras, and cellular phones.

For example, the optical element of the present invention can be used for an optical device including a housing and an optical system that includes multiple optical elements (optical lenses) in the housing.

(Method for Producing Optical Glass)

A method for producing an optical glass of the present invention is a containerless solidification method as follows: A glass material is irradiated with a carbon dioxide gas laser to form a melt. The melt is levitated with a gaseous fluid (levitation gas) ejected from a nozzle and then cooled to solidify. As the gas species of the gaseous fluid, air, nitrogen, oxygen, or an inert gas typified, for example, by argon can be used in accordance with applications. The gas flow rate can be 200 to 5,000 ml/min in accordance with the levitation of the melt.

The containerless solidification method refers to a process for forming a glass by heating and melting a material and cooling and solidifying the melt without using a container composed of, for example, a Pt alloy (Pt or a platinum alloy, such as Pt—Au or Pt—Au—Rh) or a C-based material (for example, C or SiC).

The containerless solidification method has two main characteristics. First, since no container is used, there is no heterogeneous nucleation that occurs at the interface between a melt and a container, and a deep degree of cooling can be obtained. Second, since no container is used, a sample having a high melting point higher than the melting point of a container itself (for example, 1,768° C. for Pt) can be melted by heating.

The containerless solidification method includes the main steps of heating and melting a glass material, levitating the melt obtained by heating and melting the glass material, and cooling and solidifying the melt by turning off a heat source.

In the step of heating and melting a glass material, a laser heat source typified by a carbon dioxide gas laser, a high-frequency heat source, a microwave heat source, an image furnace using condensing a halogen lamp, or the like can be used as the heat source.

In the step of levitating the melt, magnetic levitation, electrostatic levitation, sonic levitation, gas-jet levitation (gas levitation), a combination thereof (for example, the sonic levitation and the gas-jet levitation), or a microgravity condition (for example, falling or outer space) can be used. Among these, the gas-jet levitation (gas levitation) is preferably used because levitation can be performed with a simple device configuration.

In the step of cooling and solidifying the melt in a levitated state, a transparent glass sphere can be formed by cooling and solidifying the melt at a cooling rate that does not generate a crystal from the melt.

(Method for Producing Optical Lens)

In a method for producing an optical lens of the present invention, a lens preform of the optical glass is provided. The provided lens preform is press-molded with a molding machine, illustrated in FIG. 1, including mold members having an upper mold and a lower mold. Next, the molded lens preform is released from the mold member to form an optical lens.

FIG. 1 is a schematic view of the molding machine used in the method for producing an optical lens of the present invention. The method for producing an optical lens will be described with reference to FIG. 1. A molding machine 50 includes a chamber 51 and a mold assembly 10. A lens preform 52 to be molded is charged into the mold assembly 10. The molding machine 50 includes a heater 53, a shaft 54 configured to press the upper mold, a cylindrical mold 55 used to determine the shaft position when the upper mold is pressed, and a support 56 for supporting the lower mold and applying a pressure.

The inside of the chamber 51 is replaced with nitrogen. The lens preform 52, the mold assembly 10, and the cylindrical mold 55 are heated to a desired temperature with the heater 53. The lens preform 52 is press-molded with the mold assembly 10 disposed on the upper and lower sides thereof using the shaft 54 and the support 56.

Preferably, each of the mold members, i.e., the upper mold and the lower mold of the mold assembly 10, has a release film on a surface that comes into contact with the lens preform. As the release film, a metal-based film or an amorphous carbon film can be used. The amorphous carbon film is excellent in corrosion resistance and thus is preferably used.

EXAMPLES

The present invention will be described below with reference to examples.

Produced glasses were subjected to inductively coupled plasma (ICP) emission spectroscopy.

In each of Examples 1 to 57, glass raw materials, i.e., $B_2O_3$ ($H_3BO_3$), $La_2O_3$ ($LaF_3$, $La_2S_3$), $Nb_2O_5$, $TiO_2$ ($TiS_2$), and ZnO, were weighed in such a manner that a glass had a cation composition given in Table 1 and that the total amount of the glass raw materials was 10 g.

Figure 2:
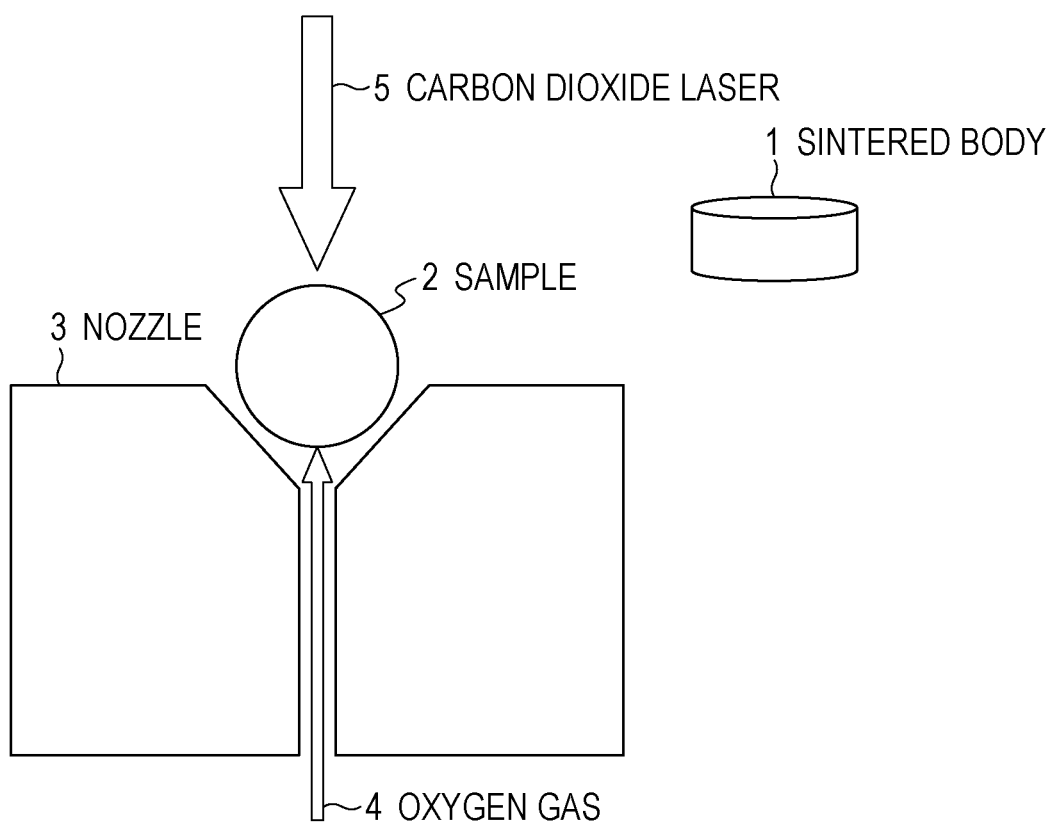
FIG. 2 is a schematic view of a gas-jet levitation device used in Examples.
Figure 3:
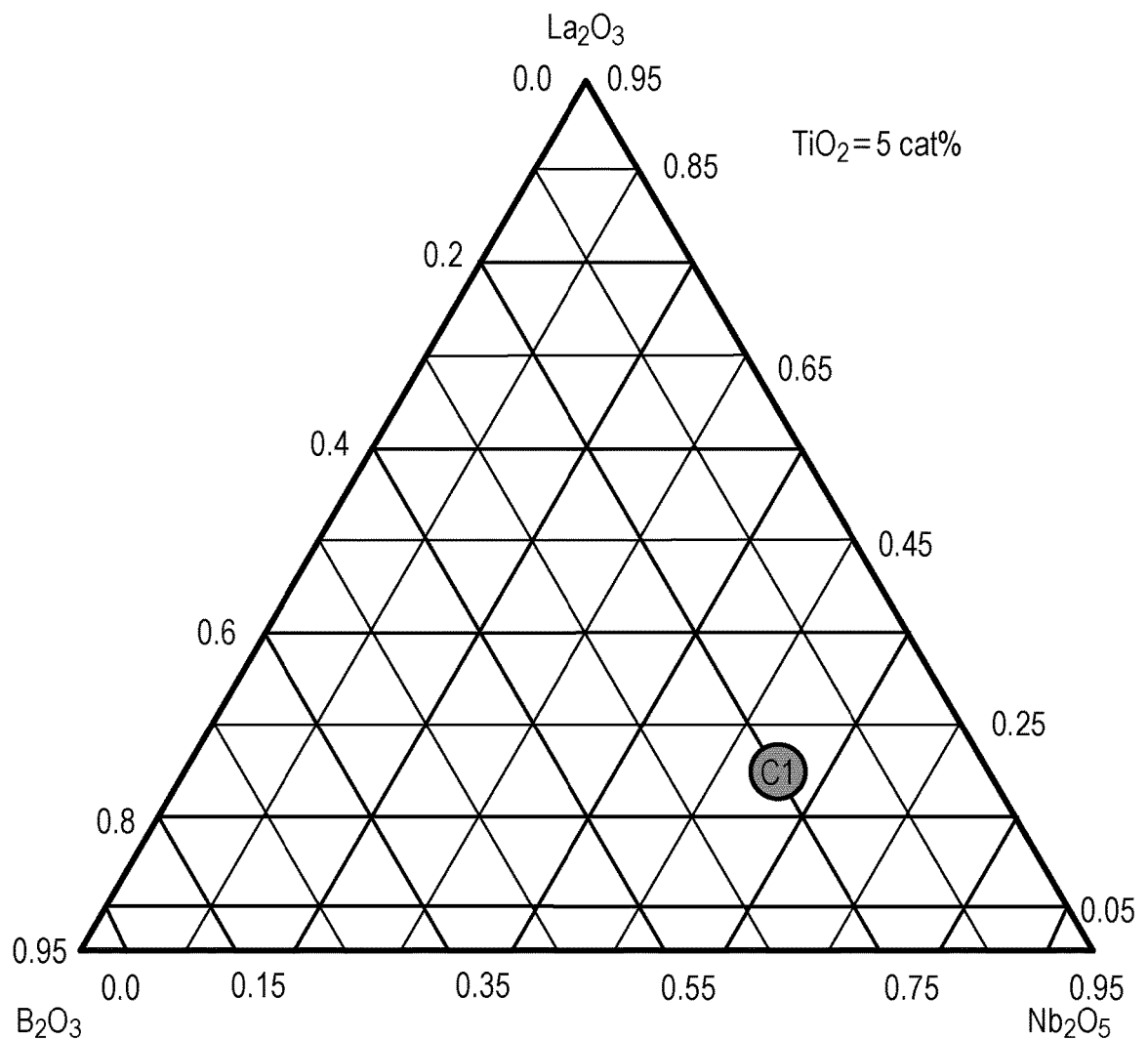
FIG. 3 is a ternary phase diagram of $B_2O_3$—$La_2O_3$—$Nb_2O_5$ at $Ti^{4+}$=5 cat % in Example and Comparative example.
Figure 4:
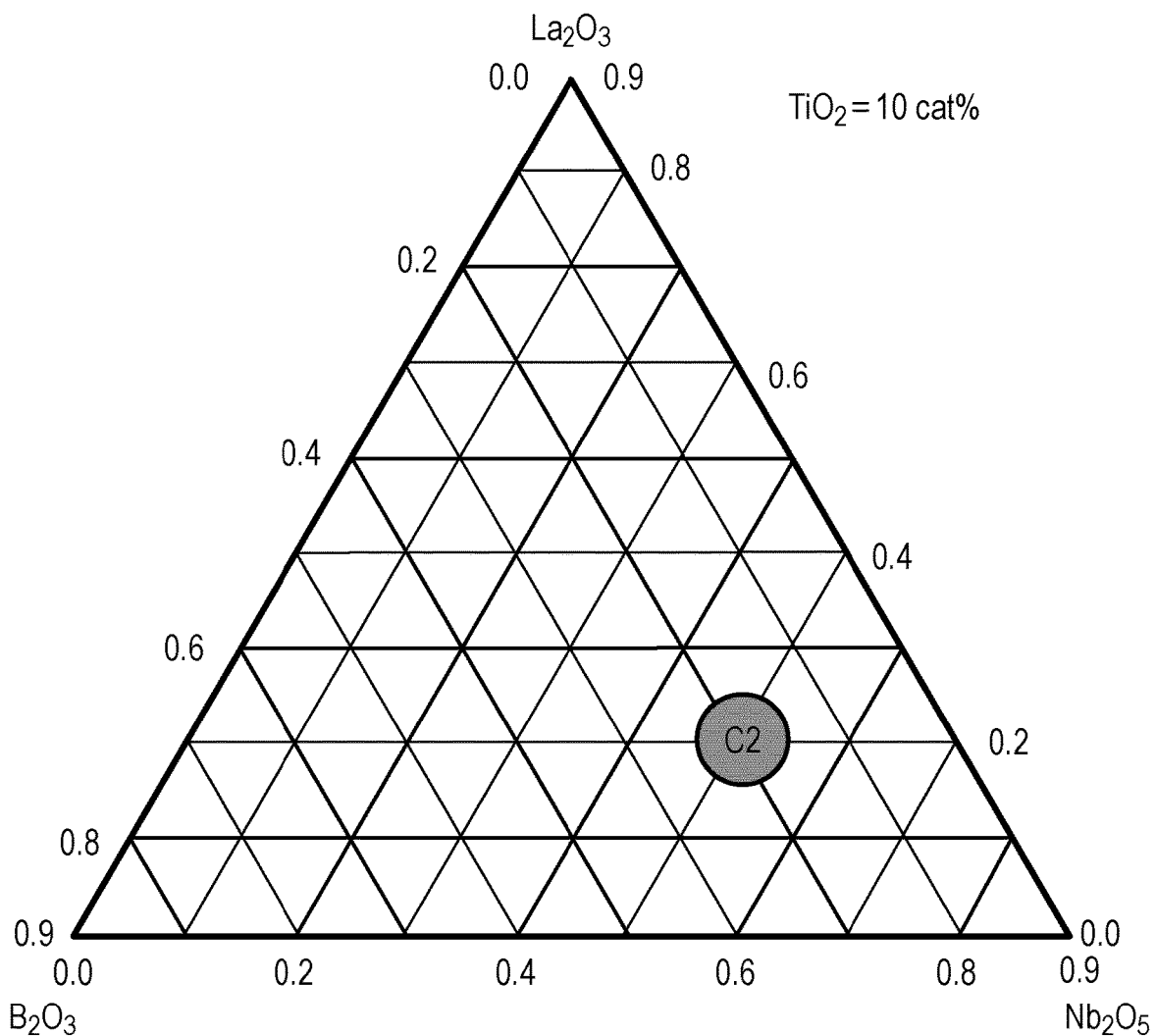
FIG. 4 is a ternary phase diagram of $B_2O_3$—$La_2O_3$—$Nb_2O_5$ at $Ti^{4+}$=10 cat % in Example and Comparative example.
Figure 5:
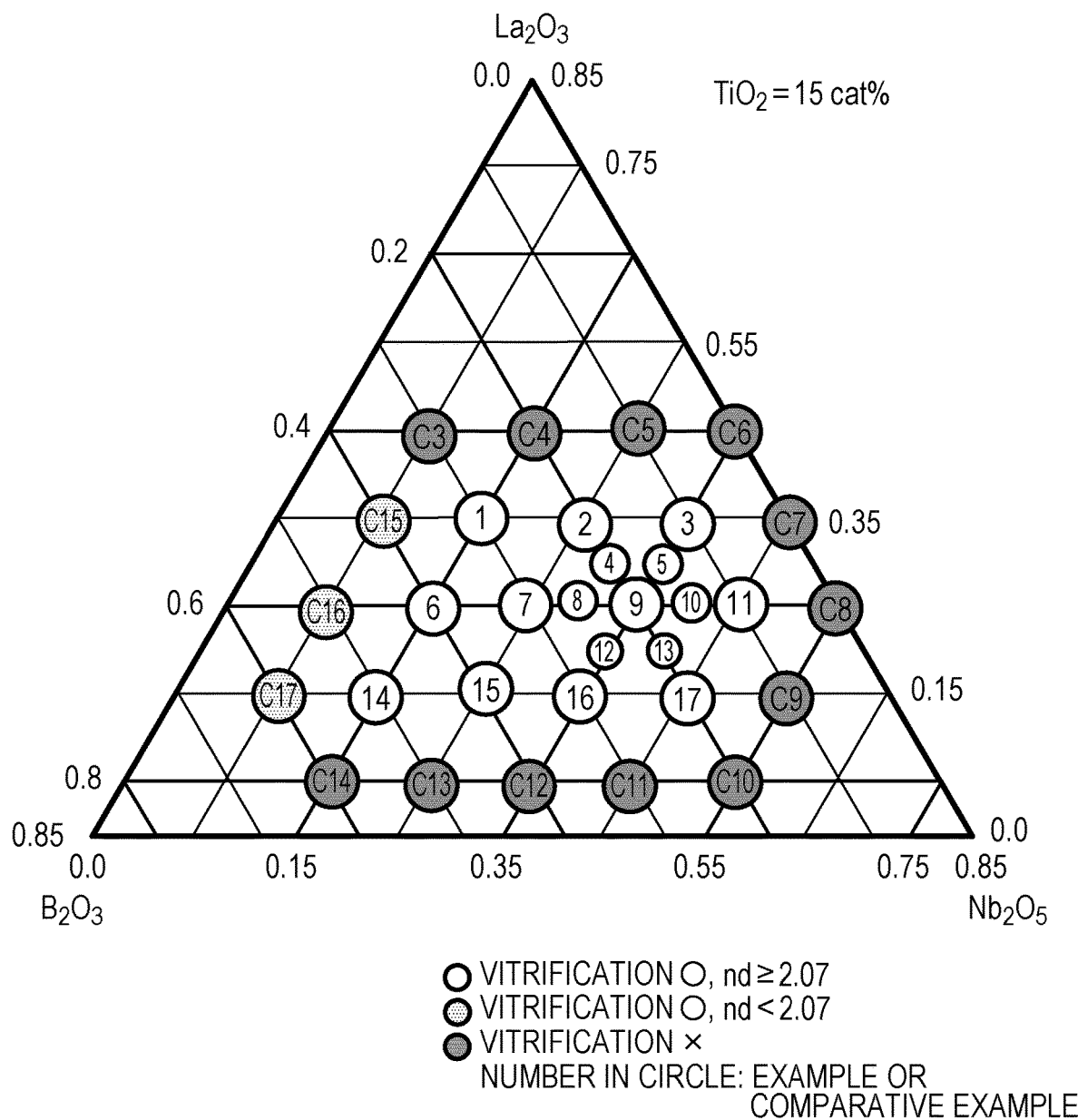
FIG. 5 is a ternary phase diagram of $B_2O_3$—$La_2O_3$—$Nb_2O_5$ at $Ti^{4+}$=15 cat % in Examples and Comparative examples.
Figure 6:
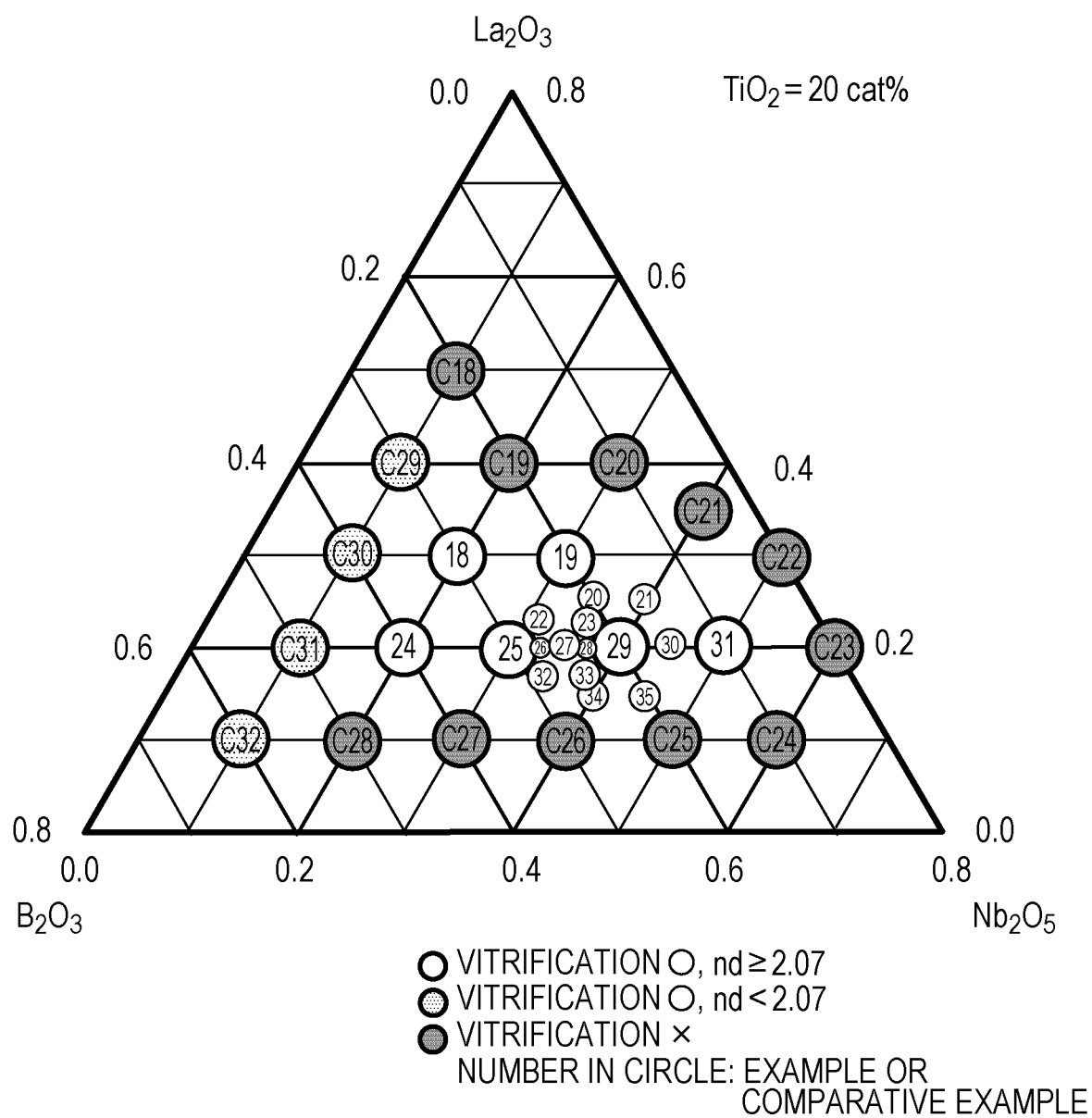
FIG. 6 is a ternary phase diagram of $B_2O_3$—$La_2O_3$—$Nb_2O_5$ at $Ti^{4+}=20$ cat % in Examples and Comparative examples.

The raw materials for glass synthesis were mixed for 15 minutes with an agate mortar so as to obtain a uniform mixture. To remove water in the mixture, the mixture was fired at 600° C. for 7 hours in an electric furnace. The fired powder was charged into a pressing rubber mold and then held at 20 kN for 1 minute by a cold isostatic pressing method. The resulting rod-shaped powder (green compact) was fired at 1,200° C. for 7 hours to provide a sintered body 1. The sintered body 1 was placed on a nozzle 3 of a gas-jet levitation device illustrated in FIG. 2 and heated by irradiation with a carbon dioxide gas laser 5 from above while oxygen gas 4 was allowed to flow through a nozzle hole at a flow rate of 500 ml/min Regarding the oxygen gas 4, dry air, nitrogen, or another gas may be used as long as a sample 2 can be levitated. The gas flow rate can be appropriately adjusted in the range of 0.5 to 6 L/min in accordance with the size of the sintered body 1. It was observed that the sintered body 1 placed on the nozzle 3 of the gas-jet levitation device was heated to form a complete melt while being levitated by the oxygen gas. Then the melt was rapidly cooled by cutting-off the laser output to provide a transparent spherical sample 2 composed of the optical glass.

The spherical sample 2 was introduced as a glass material, and continuous molding of optical elements was performed with the molding machine 50, illustrated in FIG. 1, including the mold assembly 10 including the upper mold and the lower mold and the cylindrical mold 55 configured to accommodate them on the same axis. The upper mold is connected to the shaft 54. The glass material placed in the lower mold can be press-molded by vertically moving the press shaft 54. The heater 53 is built in the cylindrical mold, and the temperature of the upper and lower molds can be controlled. A cemented carbide mainly containing tungsten carbide was selected as the mold material. The molding surface of the upper mold was processed into a convex shape. The molding surface of the lower mold was processed into a concave shape. An optical element having a convex meniscus shape was molded. A carbon film was formed on the molding surface of each of the upper mold and the lower mold. The mold assembly 10 was heated by the heater 53 in a state where the upper mold was sufficiently pulled up by moving the press shaft. Pressing was performed while the upper and lower molds had a temperature of Tg+50° C. or lower, thereby providing a glass-molded lens.

In Comparative examples 1 to 42, the glass raw materials, i.e., $B_2O_3$ ($H_3BO_3$), $La_2O_3$ ($LaF_3$, $La_2S_3$), $Nb_2O_5$, $TiO_2$ ($TiS_2$), and ZnO, were weighed in such a manner that glasses had cation compositions given in Tables 2 and 3 and that the total amount of the glass raw materials was 10 g. Optical glasses and glass-molded lenses according to Comparative examples 1 to 42 were produced as in Examples, except that different compositions of the glass raw materials were used.

[Evaluation Method] (Determination of Vitrification)

Each spherical sample 2 was observed under an optical microscope (×100) to determine the presence or absence of crystals. In Table 1, ○ denotes a sample in which no crystals were observed when the spherical sample having a diameter of 2 mm was observed under the microscope.

(Measurement of Glass Transition Temperature and ΔTx)

The spherical sample 2 was pulverized with an agate mortar, placed in a platinum pan having an outside diameter of 5 mm and a height of 2.5 mm, and heated to 1,200° C. at a rate of temperature increase of 10° C./min with a DSC8270 differential scanning calorimeter (DSC), available from Rigaku Corporation, to detect the glass transition temperature (Tg). The difference between the crystallization onset temperature Tx and the glass transition temperature Tg, ΔTx (Tx−Tg=ΔTx), was determined.

(Measurement of Refractive Index)

Two surfaces perpendicular to each other were formed by grinding, and then the refractive index and the Abbe number were measured with KPR-2000, available from Shimadzu Corporation. In the case where the sample was small, the transparent spherical sample was ground into a hemispherical shape, and then measurement was performed with an ellipsometer (M-2000F, available from J. A. Woollam. Co., Inc).

(Evaluation Result)

Tables 1 and 2 present the results of the transparent spherical samples obtained in Examples 1 to 57. Tables 3 and 4 present those of Comparative examples 1 to 42.

As given in Tables 1 and 2, optical glasses having the following compositions were produced: a $B^{3+}$ content of 10 cat % or more and 50 cat % or less, a total rare-earth ion content, such as La', of 15 cat % or more and 35 cat % or less, a $Nb^{5+}$ content of 20 cat % or more and 50 cat % or less, and a $Ti^{4+}$ content of 15 cat % or more and 25 cat % or less. In each of the optical glasses of Examples 1 to 57, no crystals were observed by the optical microscopic observation, the glass transition temperature was determined by measurement with the differential scanning calorimeter, and a transparent spherical sample was obtained. Each of the optical glasses of Examples 1 to 57 had a refractive index for the d line (587.56 nm) of 2.07 or more and 2.31 or less and an Abbe number (vd) of 25 or less. After pressing, none of these glass-molded lenses have defective appearance, such as cracking, chipping, or clouding.

Figure 7:
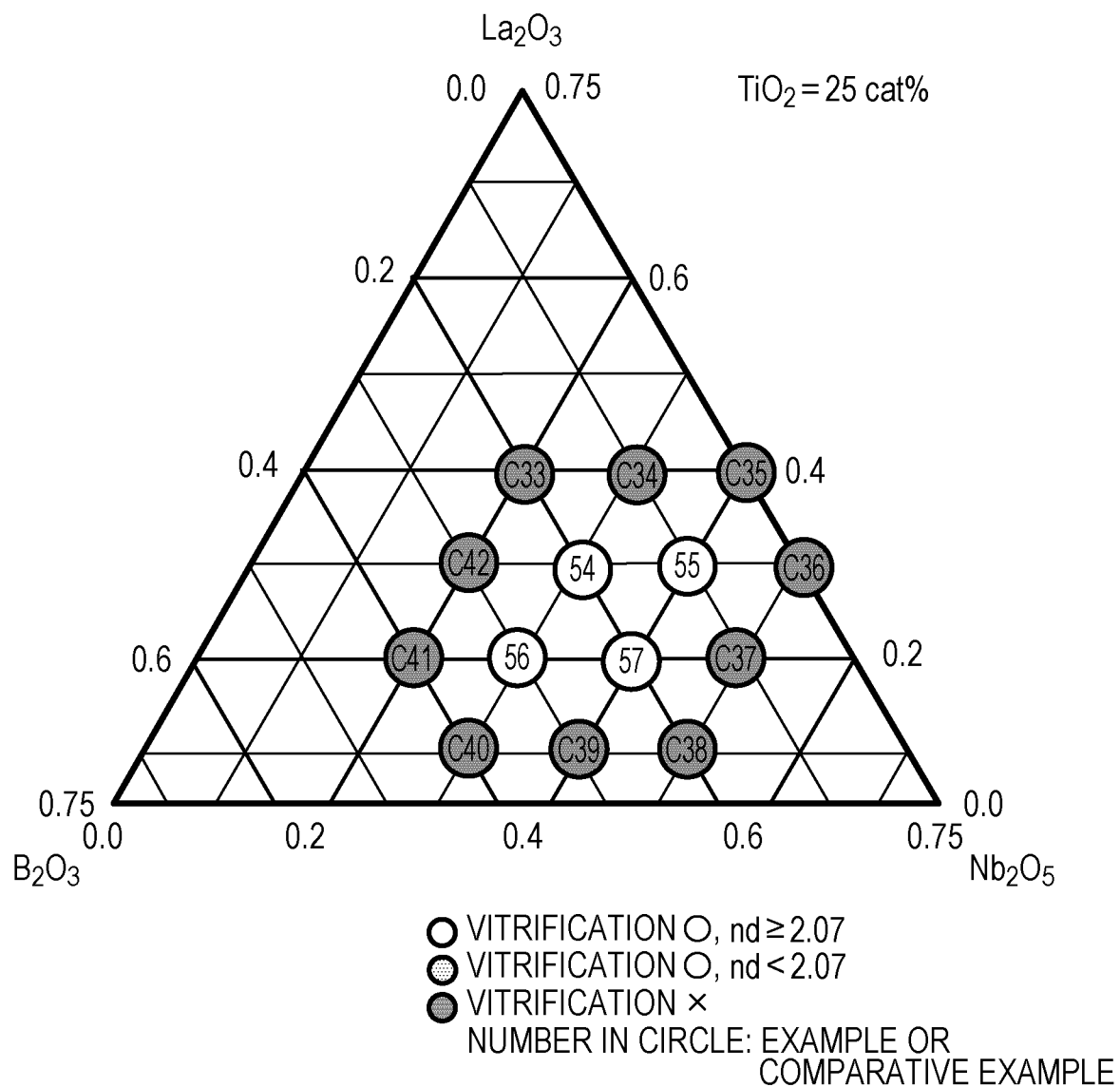
FIG. 7 is a ternary phase diagram of $B_2O_3$—$La_2O_3$—$Nb_2O_5$ at $Ti^{4+}=25$ cat % in Examples and Comparative examples.

FIGS. 3 to 7 are ternary phase diagrams of $B_2O_3$—$La_2O_3$—$Nb_2O_5$ in Examples and Comparative examples at a $Ti^{4+}$ content of 5 cat % (FIG. 3), 10 cat % (FIG. 4), 15 cat % (FIG. 5), 20 cat % (FIG. 6), and 25 cat % (FIG. 7).

As presented in Tables 3 and 4, in each of Comparative examples 1 to 14, 18 to 28, and 33 to 42, the glass composition specified in Claims was not satisfied, and glass was not formed. In each of Comparative examples 15 to 17 and 29 to 32, the $Ti^{4+}$ content of the composition was low and did not satisfy Claims. Although glass was formed, a high-refractive-index glass having a refractive index nd of 2.07 or more was not produced because of the low $Ti^{4+}$ content.

TABLE 1

| | $B^{3+}$ (cat %) | $La^{3+}$ (cat %) | $Nb^{5+}$ (cat %) | $Ti^{4+}$ (cat %) | $Al^{3+}$ (cat %) | $Ga^{3+}$ (cat %) | $Zn^{2+}$ (cat %) | $Ta^{5+}$ (cat %) | Total amount |
|---|---|---|---|---|---|---|---|---|---|
| Example-1 | 30 | 35 | 20 | 15 | 0 | 0 | 0 | 0 | 100 |
| Example-2 | 20 | 35 | 30 | 15 | 0 | 0 | 0 | 0 | 100 |
| Example-3 | 10 | 35 | 40 | 15 | 0 | 0 | 0 | 0 | 100 |
| Example-4 | 20 | 30 | 35 | 15 | 0 | 0 | 0 | 0 | 100 |
| Example-5 | 15 | 30 | 40 | 15 | 0 | 0 | 0 | 0 | 100 |
| Example-6 | 40 | 25 | 20 | 15 | 0 | 0 | 0 | 0 | 100 |
| Example-7 | 30 | 25 | 30 | 15 | 0 | 0 | 0 | 0 | 100 |
| Example-8 | 25 | 25 | 35 | 15 | 0 | 0 | 0 | 0 | 100 |
| Example-9 | 20 | 25 | 40 | 15 | 0 | 0 | 0 | 0 | 100 |
| Example-10 | 15 | 25 | 45 | 15 | 0 | 0 | 0 | 0 | 100 |
| Example-11 | 10 | 25 | 50 | 15 | 0 | 0 | 0 | 0 | 100 |
| Example-12 | 25 | 20 | 40 | 15 | 0 | 0 | 0 | 0 | 100 |
| Example-13 | 20 | 20 | 45 | 15 | 0 | 0 | 0 | 0 | 100 |
| Example-14 | 50 | 15 | 20 | 15 | 0 | 0 | 0 | 0 | 100 |
| Example-15 | 40 | 15 | 30 | 15 | 0 | 0 | 0 | 0 | 100 |
| Example-16 | 30 | 15 | 40 | 15 | 0 | 0 | 0 | 0 | 100 |
| Example-17 | 20 | 15 | 50 | 15 | 0 | 0 | 0 | 0 | 100 |
| Example-18 | 30 | 30 | 20 | 20 | 0 | 0 | 0 | 0 | 100 |
| Example-19 | 20 | 30 | 30 | 20 | 0 | 0 | 0 | 0 | 100 |
| Example-20 | 20 | 25 | 35 | 20 | 0 | 0 | 0 | 0 | 100 |
| Example-21 | 15 | 25 | 40 | 20 | 0 | 0 | 0 | 0 | 100 |
| Example-22 | 25 | 22.5 | 32.5 | 20 | 0 | 0 | 0 | 0 | 100 |
| Example-23 | 22.5 | 22.5 | 35 | 20 | 0 | 0 | 0 | 0 | 100 |
| Example-24 | 40 | 20 | 20 | 20 | 0 | 0 | 0 | 0 | 100 |
| Example-25 | 30 | 20 | 30 | 20 | 0 | 0 | 0 | 0 | 100 |
| Example-26 | 27.5 | 20 | 32.5 | 20 | 0 | 0 | 0 | 0 | 100 |
| Example-27 | 25 | 20 | 35 | 20 | 0 | 0 | 0 | 0 | 100 |
| Example-28 | 22.5 | 20 | 37.5 | 20 | 0 | 0 | 0 | 0 | 100 |
| Example-29 | 20 | 20 | 40 | 20 | 0 | 0 | 0 | 0 | 100 |
| Example-30 | 15 | 20 | 45 | 20 | 0 | 0 | 0 | 0 | 100 |

| | Vitrification 2ϕ | Vitrification 6ϕ | Tg (° C.) | ΔTx (Tx − Tg) | nd | vd | θg, F | Density (g/cm³) |
|---|---|---|---|---|---|---|---|---|
| Example-1 | ◯ | not conducted | 690 | 70.0 | 2.11015 | 24.15 | not measured | not measured |
| Example-2 | ◯ | not conducted | 697 | 59.7 | 2.18015 | 24.11 | not measured | not measured |
| Example-3 | ◯ | not conducted | 704 | 49.5 | 2.24605 | 23.01 | not measured | not measured |
| Example-4 | ◯ | not conducted | 678 | 63.7 | 2.20755 | 22.71 | not measured | not measured |
| Example-5 | ◯ | not conducted | 682 | 58.6 | 2.24050 | 22.16 | not measured | not measured |
| Example-6 | ◯ | not conducted | 645 | 88.3 | 2.09206 | 22.71 | not measured | not measured |
| Example-7 | ◯ | not conducted | 653 | 78.0 | 2.16905 | 22.41 | not measured | not measured |
| Example-8 | ◯ | ◯ | 656 | 72.9 | 2.20200 | 21.86 | not measured | not measured |
| Example-9 | ◯ | ◯ | 654 | 70.8 | 2.23495 | 21.31 | not measured | 5.031 |
| Example-10 | ◯ | ◯ | 664 | 62.6 | 2.26790 | 20.76 | not measured | 5.272 |
| Example-11 | ◯ | not conducted | 667 | 57.4 | 2.30085 | 20.21 | not measured | not measured |
| Example-12 | ◯ | ◯ | 634 | 73.8 | 2.22940 | 20.46 | not measured | not measured |
| Example-13 | ◯ | not conducted | 651 | 71.7 | 2.26235 | 19.91 | not measured | not measured |
| Example-14 | ◯ | not conducted | 601 | 106.5 | 2.07396 | 21.27 | not measured | not measured |
| Example-15 | ◯ | not conducted | 609 | 96.3 | 2.15795 | 20.71 | not measured | not measured |
| Example-16 | ◯ | not conducted | 616 | 86.0 | 2.22385 | 19.61 | not measured | not measured |
| Example-17 | ◯ | not conducted | 623 | 75.7 | 2.28975 | 18.51 | not measured | not measured |
| Example-18 | ◯ | not conducted | 670 | 79.3 | 2.10512 | 22.54 | not measured | not measured |
| Example-19 | ◯ | not conducted | 689 | 63.6 | 2.17922 | 21.34 | not measured | not measured |
| Example-20 | ◯ | not conducted | 661 | 69.6 | 2.19350 | 22.03 | not measured | 5.121 |
| Example-21 | ◯ | not conducted | 665 | 64.4 | 2.22645 | 21.48 | not measured | 5.257 |

TABLE 1-continued

|  | Vitrification2φ | Vitrification 6φ | Tg (°C.) | ΔTx (Tx − Tg) | nd | vd | θg, F | Density (g/cm³) |
|---|---|---|---|---|---|---|---|---|
| Example-22 | o | o | 648 | 76.7 | 2.17000 | 19.93 | not measured | 4.898 |
| Example-23 | o | o | 649 | 70.3 | 2.18853 | 19.63 | 0.6371 | 5.007 |
| Example-24 | o | not conducted | 633 | 90.3 | 2.07842 | 21.14 | not measured | not measured |
| Example-25 | o | o | 633 | 84.1 | 2.14432 | 20.04 | 0.6366 | 4.618 |
| Example-26 | o | o | 637 | 81.3 | 2.16333 | 19.58 | not measured | 4.791 |
| Example-27 | o | o | 640 | 78.2 | 2.17980 | 19.31 | 0.6408 | 4.89 |
| Example-28 | o | o | 642 | 69.6 | 2.19834 | 19.00 | 0.6439 | 4.834 |
| Example-29 | o | o | 647 | 74.0 | 2.22090 | 20.63 | 0.7169 | not measured |
| Example-30 | o | not conducted | 646 | 68.4 | 2.25385 | 20.08 | not measured | not measured |

TABLE 2

|  | B³⁺ (cat %) | La³⁺ (cat %) | Nb⁵⁺ (cat %) | Ti⁴⁺ (cat %) | Al³⁺ (cat %) | Ga³⁺ (cat %) | Zn²⁺ (cat %) | Ta⁵⁺ (cat %) | Total amount |
|---|---|---|---|---|---|---|---|---|---|
| Example-31 | 10 | 20 | 50 | 20 | 0 | 0 | 0 | 0 | 100 |
| Example-32 | 27.5 | 17.5 | 35 | 20 | 0 | 0 | 0 | 0 | 100 |
| Example-33 | 25 | 17.5 | 37.5 | 20 | 0 | 0 | 0 | 0 | 100 |
| Example-34 | 25 | 15 | 40 | 20 | 0 | 0 | 0 | 0 | 100 |
| Example-35 | 20 | 15 | 45 | 20 | 0 | 0 | 0 | 0 | 100 |
| Example-36 | 25 | 20 | 25 | 20 | 0 | 0 | 0 | 10 | 100 |
| Example-37 | 25 | 20 | 20 | 20 | 0 | 0 | 0 | 15 | 100 |
| Example-38 | 22.5 | 20 | 35 | 20 | 0 | 2.5 | 0 | 0 | 100 |
| Example-39 | 20 | 20 | 35 | 20 | 0 | 5 | 0 | 0 | 100 |
| Example-40 | 22.5 | 20 | 35 | 20 | 2.5 | 0 | 0 | 0 | 100 |
| Example-41 | 20 | 20 | 35 | 20 | 5 | 0 | 0 | 0 | 100 |
| Example-42 | 22.5 | 22.5 | 25 | 20 | 0 | 0 | 0 | 10 | 100 |
| Example-43 | 20 | 22.5 | 35 | 20 | 0 | 2.5 | 0 | 0 | 100 |
| Example-44 | 20 | 22.5 | 35 | 20 | 2.5 | 0 | 0 | 0 | 100 |
| Example-45 | 20 | 22.5 | 25 | 20 | 2.5 | 0 | 0 | 10 | 100 |
| Example-46 | 17.5 | 22.5 | 35 | 20 | 0 | 0 | 5 | 0 | 100 |
| Example-47 | 12.5 | 22.5 | 35 | 20 | 0 | 0 | 10 | 0 | 100 |
| Example-48 | 15 | 22.5 | 25 | 20 | 2.5 | 0 | 5 | 10 | 100 |
| Example-49 | 10 | 22.5 | 25 | 20 | 2.5 | 0 | 10 | 10 | 100 |
| Example-50 | 22.5 | 20 | 25 | 20 | 2.5 | 0 | 0 | 10 | 100 |
| Example-51 | 15 | 20 | 35 | 20 | 0 | 0 | 10 | 0 | 100 |
| Example-52 | 17.5 | 20 | 25 | 20 | 2.5 | 0 | 5 | 10 | 100 |
| Example-53 | 12.5 | 20 | 25 | 20 | 2.5 | 0 | 10 | 10 | 100 |
| Example-54 | 20 | 25 | 30 | 25 | 0 | 0 | 0 | 0 | 100 |
| Example-55 | 10 | 25 | 40 | 25 | 0 | 0 | 0 | 0 | 100 |
| Example-56 | 30 | 15 | 30 | 25 | 0 | 0 | 0 | 0 | 100 |
| Example-57 | 20 | 15 | 40 | 25 | 0 | 0 | 0 | 0 | 100 |

|  | Vitrification2φ | Vitrification 6φ | Tg (°C.) | ΔTx (Tx − Tg) | nd | vd | θg, F | Density (g/cm³) |
|---|---|---|---|---|---|---|---|---|
| Example-31 | o | not conducted | 650 | 63.3 | 2.28680 | 19.53 | not measured | not measured |
| Example-32 | o | o | 628 | 83.3 | 2.17108 | 18.98 | not measured | 4.602 |
| Example-33 | o | not conducted | 630 | 80.7 | 2.18960 | 18.68 | not measured | not measured |
| Example-34 | o | not conducted | 621 | 82.7 | 2.22588 | 20.26 | not measured | 4.71 |
| Example-35 | o | not conducted | 624 | 77.5 | 2.23460 | 19.93 | not measured | not measured |
| Example-36 | o | not conducted | 656 | 79.1 | 2.19479 | 19.84 | 0.6358 | not measured |
| Example-37 | o | not conducted | 672 | 80.1 | 2.19599 | 20.06 | 0.6360 | 5.471 |
| Example-38 | o | not conducted | 644 | 75.2 | 2.20024 | 19.30 | 0.6377 | 4.853 |
| Example-39 | o | not conducted | 648 | 75.8 | 2.19009 | 19.52 | 0.6362 | 4.898 |
| Example-40 | o | not conducted | 649 | 84.6 | 2.18806 | 19.43 | 0.6400 | 4.832 |
| Example-41 | o | not conducted | 653 | 81.8 | 2.18285 | 19.65 | 0.6370 | 4.732 |
| Example-42 | o | not conducted | 666 | 78.4 | 2.19539 | 20.24 | 0.6315 | 5.469 |

TABLE 2-continued

| Example | | | | | | | | |
|---|---|---|---|---|---|---|---|---|
| Example-43 | ○ | not conducted | 648 | 75.2 | 2.18438 | 19.86 | 0.6358 | 4.93 |
| Example-44 | ○ | not conducted | 654 | 76.3 | 2.18668 | 19.88 | 0.5995 | 4.942 |
| Example-45 | ○ | not conducted | 676 | 76.0 | 2.19341 | 20.54 | 0.6320 | not measured |
| Example-46 | ○ | not conducted | 637 | 73.4 | 2.20546 | 19.87 | 0.6349 | not measured |
| Example-47 | ○ | not conducted | 635 | 59.5 | 2.21359 | 20.03 | 0.6321 | not measured |
| Example-48 | ○ | not conducted | 666 | 74.4 | 2.19998 | 20.64 | 0.6304 | 5.583 |
| Example-49 | ○ | not conducted | 670 | 55.9 | 2.20387 | 20.65 | 0.6298 | not measured |
| Example-50 | ○ | not conducted | 664 | 88.4 | 2.17349 | 20.17 | 0.6343 | not measured |
| Example-51 | ○ | not conducted | 620 | 79.2 | 2.20078 | 19.71 | 0.6364 | not measured |
| Example-52 | ○ | not conducted | 653 | 84.0 | 2.18471 | 20.38 | 0.6338 | not measured |
| Example-53 | ○ | not conducted | 652 | 72.9 | 2.20225 | 20.54 | 0.6291 | not measured |
| Example-54 | ○ | not conducted | 662 | 71.4 | 2.18105 | 20.96 | not measured | not measured |
| Example-55 | ○ | not conducted | 669 | 61.1 | 2.25515 | 19.56 | not measured | not measured |
| Example-56 | ○ | not conducted | 618 | 89.7 | 2.29335 | 19.76 | not measured | not measured |
| Example-57 | ○ | not conducted | 625 | 79.4 | 2.22025 | 18.46 | not measured | not measured |

TABLE 3

| | $B^{3+}$ (cat %) | $La^{3+}$ (cat %) | $Nb^{5+}$ (cat %) | $Ti^{4+}$ (cat %) | $Al^{3+}$ (cat %) | $Ga^{3+}$ (cat %) | $Zn^{2+}$ (cat %) |
|---|---|---|---|---|---|---|---|
| Comparative example-1 | 20 | 20 | 55 | 5 | 0 | 0 | 0 |
| Comparative example-2 | 20 | 20 | 50 | 10 | 0 | 0 | 0 |
| Comparative example-3 | 30 | 45 | 10 | 15 | 0 | 0 | 0 |
| Comparative example-4 | 20 | 45 | 20 | 15 | 0 | 0 | 0 |
| Comparative example-5 | 10 | 45 | 30 | 15 | 0 | 0 | 0 |
| Comparative example-6 | 0 | 45 | 40 | 15 | 0 | 0 | 0 |
| Comparative example-7 | 0 | 35 | 50 | 15 | 0 | 0 | 0 |
| Comparative example-8 | 0 | 25 | 60 | 15 | 0 | 0 | 0 |
| Comparative example-9 | 10 | 15 | 60 | 15 | 0 | 0 | 0 |
| Comparative example-10 | 20 | 5 | 60 | 15 | 0 | 0 | 0 |
| Comparative example-11 | 30 | 5 | 50 | 15 | 0 | 0 | 0 |
| Comparative example-12 | 40 | 5 | 40 | 15 | 0 | 0 | 0 |
| Comparative example-13 | 50 | 5 | 30 | 15 | 0 | 0 | 0 |
| Comparative example-14 | 60 | 5 | 20 | 15 | 0 | 0 | 0 |
| Comparative example-15 | 40 | 35 | 10 | 15 | 0 | 0 | 0 |
| Comparative example-16 | 50 | 25 | 10 | 15 | 0 | 0 | 0 |
| Comparative example-17 | 60 | 15 | 10 | 15 | 0 | 0 | 0 |
| Comparative example-18 | 20 | 50 | 10 | 20 | 0 | 0 | 0 |
| Comparative example-19 | 20 | 40 | 20 | 20 | 0 | 0 | 0 |
| Comparative example-20 | 10 | 40 | 30 | 20 | 0 | 0 | 0 |

TABLE 3-continued

| | | | | | | | |
|---|---|---|---|---|---|---|---|
| Comparative example-21 | 5 | 35 | 40 | 20 | 0 | 0 | 0 |
| Comparative example-22 | 0 | 30 | 50 | 20 | 0 | 0 | 0 |
| Comparative example-23 | 0 | 20 | 60 | 20 | 0 | 0 | 0 |
| Comparative example-24 | 10 | 10 | 60 | 20 | 0 | 0 | 0 |
| Comparative example-25 | 20 | 10 | 50 | 20 | 0 | 0 | 0 |
| Comparative example-26 | 30 | 10 | 40 | 20 | 0 | 0 | 0 |
| Comparative example-27 | 40 | 10 | 30 | 20 | 0 | 0 | 0 |
| Comparative example-28 | 50 | 10 | 20 | 20 | 0 | 0 | 0 |
| Comparative example-29 | 30 | 40 | 10 | 20 | 0 | 0 | 0 |
| Comparative example-30 | 40 | 30 | 10 | 20 | 0 | 0 | 0 |

| | $Ta^{5+}$ (cat %) | Total amount | Vitrification 2φ | Tg (°C.) | ΔTx (Tx − Tg) | nd | vd | Density (g/cm³) |
|---|---|---|---|---|---|---|---|---|
| Comparative example-1 | 0 | 100 | x | — | — | — | — | — |
| Comparative example-2 | 0 | 100 | x | — | — | — | — | — |
| Comparative example-3 | 0 | 100 | x | — | — | — | — | — |
| Comparative example-4 | 0 | 100 | x | — | — | — | — | — |
| Comparative example-5 | 0 | 100 | x | — | — | — | — | — |
| Comparative example-6 | 0 | 100 | x | — | — | — | — | — |
| Comparative example-7 | 0 | 100 | x | — | — | — | — | — |
| Comparative example-8 | 0 | 100 | x | — | — | — | — | — |
| Comparative example-9 | 0 | 100 | x | — | — | — | — | — |
| Comparative example-10 | 0 | 100 | x | — | — | — | — | — |
| Comparative example-11 | 0 | 100 | x | — | — | — | — | — |
| Comparative example-12 | 0 | 100 | x | — | — | — | — | — |
| Comparative example-13 | 0 | 100 | x | — | — | — | — | — |
| Comparative example-14 | 0 | 100 | x | — | — | — | — | — |
| Comparative example-15 | 0 | 100 | ○ | 682 | 80.3 | 2.04262 | 24.91 | 4.57 |
| Comparative example-16 | 0 | 100 | ○ | 638 | 98.6 | 2.02453 | 23.47 | 4.07 |
| Comparative example-17 | 0 | 100 | ○ | 594 | 116.8 | 2.00644 | 22.04 | 3.47 |
| Comparative example-18 | 0 | 100 | x | — | — | — | — | — |
| Comparative example-19 | 0 | 100 | x | — | — | — | — | — |
| Comparative example-20 | 0 | 100 | x | — | — | — | — | — |
| Comparative example-21 | 0 | 100 | x | — | — | — | — | — |
| Comparative example-22 | 0 | 100 | x | — | — | — | — | — |
| Comparative example-23 | 0 | 100 | x | — | — | — | — | — |
| Comparative example-24 | 0 | 100 | x | — | — | — | — | — |
| Comparative example-25 | 0 | 100 | x | — | — | — | — | — |
| Comparative example-26 | 0 | 100 | x | — | — | — | — | — |
| Comparative example-27 | 0 | 100 | x | — | — | — | — | — |

TABLE 3-continued

| | | | | | | | |
|---|---|---|---|---|---|---|---|
| Comparative example-28 | 0 | 100 | x | — | — | — | — | — |
| Comparative example-29 | 0 | 100 | ○ | 709 | 67.9 | 2.06224 | 24.92 | 5.19 |
| Comparative example-30 | 0 | 100 | ○ | 665 | 86.1 | 2.04415 | 23.48 | 4.59 |

TABLE 4

| | $B^{3+}$ (cat %) | $La^{3+}$ (cat %) | $Nb^{5+}$ (cat %) | $Ti^{4+}$ (cat %) | $Al^{3+}$ (cat %) | $Ga^{3+}$ (cat %) | $Zn^{2+}$ (cat %) |
|---|---|---|---|---|---|---|---|
| Comparative example-31 | 50 | 20 | 10 | 20 | 0 | 0 | 0 |
| Comparative example-32 | 60 | 10 | 10 | 20 | 0 | 0 | 0 |
| Comparative example-33 | 20 | 35 | 20 | 25 | 0 | 0 | 0 |
| Comparative example-34 | 10 | 35 | 30 | 25 | 0 | 0 | 0 |
| Comparative example-35 | 0 | 35 | 40 | 25 | 0 | 0 | 0 |
| Comparative example-36 | 0 | 25 | 50 | 25 | 0 | 0 | 0 |
| Comparative example-37 | 10 | 15 | 50 | 25 | 0 | 0 | 0 |
| Comparative example-38 | 20 | 5 | 50 | 25 | 0 | 0 | 0 |
| Comparative example-39 | 30 | 5 | 40 | 25 | 0 | 0 | 0 |
| Comparative example-40 | 40 | 5 | 30 | 25 | 0 | 0 | 0 |
| Comparative example-41 | 40 | 15 | 20 | 25 | 0 | 0 | 0 |
| Comparative example-42 | 30 | 25 | 20 | 25 | 0 | 0 | 0 |

| | $Ta^{5+}$ (cat %) | Total amount | Vitrification $2\phi$ | Tg (° C.) | ΔTx (Tx − Tg) | nd | vd | Density (g/cm³) |
|---|---|---|---|---|---|---|---|---|
| Comparative example-31 | 0 | 100 | ○ | 621 | 104.4 | 2.02606 | 22.04 | 3.99 |
| Comparative example-32 | 0 | 100 | ○ | 577 | 122.7 | 2.00797 | 20.61 | 3.39 |
| Comparative example-33 | 0 | 100 | x | — | — | — | — | — |
| Comparative example-34 | 0 | 100 | x | — | — | — | — | — |
| Comparative example-35 | 0 | 100 | x | — | — | — | — | — |
| Comparative example-36 | 0 | 100 | x | — | — | — | — | — |
| Comparative example-37 | 0 | 100 | x | — | — | — | — | — |
| Comparative example-38 | 0 | 100 | x | — | — | — | — | — |
| Comparative example-39 | 0 | 100 | x | — | — | — | — | — |
| Comparative example-40 | 0 | 100 | x | — | — | — | — | — |
| Comparative example-41 | 0 | 100 | x | — | — | — | — | — |
| Comparative example-42 | 0 | 100 | x | — | — | — | — | — |

According to the present invention, it is possible to provide an optical glass that has a high refractive index, a high dispersion, and a low glass transition temperature and that is less likely to cause transfer failure when the optical glass is used as a preform in glass molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical glass, comprising:
   glass-forming cations, the optical glass satisfying, expressed in cation percent:
   10 cat % ≤ $B^{3+}$ ≤ 50 cat %,
   15 cat % ≤ $La^{3+}$ ≤ 35 cat %,
   20 cat % ≤ $Nb^{5+}$ ≤ 50 cat %, and
   15 cat % ≤ $Ti^{4+}$ ≤ 25 cat %.

2. The optical glass according to claim 1, wherein the optical glass satisfies 20 cat % ≤ $B^{3+}$ ≤ 50 cat %.

3. The optical glass according to claim 1, wherein the optical glass satisfies:
   0 cat % ≤ $Al^{3+}$ ≤ 5 cat %,
   0 cat % ≤ $Ga^{3+}$ ≤ 5 cat %,
   0 cat % ≤ $Zn^{2+}$ ≤ 10 cat %, and
   0 cat % ≤ $Ta^{5+}$ ≤ 15 cat %.

4. The optical glass according to claim 1, wherein the optical glass satisfies 0 cat % ≤ $Pb^{2+}$ ≤ 3 cat %.

5. The optical glass according to claim 1, wherein the optical glass satisfies 85 cat % (total amount of $B^{3+}$, $La^{3+}$, $Nb^{5+}$, and $Ti^{4+}$) ≤ 100 cat %.

6. The optical glass according to claim 1, wherein the optical glass has a refractive index of 2.07 or more and 2.31 or less and an Abbe number of 18 or more and 25 or less for a d line.

7. The optical glass according to claim 1, wherein the optical glass has a glass transition temperature (Tg) of 710° C. or lower.

8. An optical element, comprising the optical glass according to claim 1, the optical glass being molded.

9. An optical device, comprising a housing and an optical system including multiple optical elements in the housing,
   wherein each of the optical elements is the optical element according to claim 8.

10. A method for producing an optical glass using a containerless solidification method, comprising the steps of levitating a glass material with a levitation gas, the glass material satisfying, expressed in cation percent:
    10 cat % ≤ $B^{3+}$ ≤ 50 cat %,
    15 cat % ≤ $La^{3+}$ ≤ 35 cat %,
    20 cat % ≤ $Nb^{5+}$ ≤ 50 cat %, and
    15 cat % ≤ $Ti^{4+}$ ≤ 25 cat %,
    heating and melting the levitated glass material to form a melt, and cooling and solidifying the melt in a levitated state.

11. The method for producing an optical glass according to claim 10,
    wherein the glass material satisfies
    0 cat % ≤ $Pb^{2+}$ ≤ 3 cat %.

12. The method for producing an optical glass according to claim 10, wherein the glass material satisfies:
    0 cat % ≤ $Al^{3+}$ ≤ 5 cat %,
    0 cat % ≤ $Ga^{3+}$ ≤ 5 cat %,
    0 cat % ≤ $Zn^{2+}$ ≤ 10 cat %, and
    0 cat % ≤ $Ta^{5+}$ ≤ 15 cat %.

13. The method for producing an optical glass according to claim 10,
    wherein the glass material satisfies
    85 cat % ≤ (total amount of $B^{3+}$, $La^{3+}$, $Nb^{5+}$, and $Ti^{4+}$) ≤ 100 cat %.

14. A method for producing an optical element, comprising the steps of:
    providing a lens preform of an optical glass containing glass-forming cations, the optical glass satisfying, expressed in cation percent:
    10 cat % ≤ $B^{3+}$ ≤ 50 cat %,
    15 cat % ≤ $La^{3+}$ ≤ 35 cat %,
    20 cat % ≤ $Nb^{5+}$ ≤ 50 cat %, and
    15 cat % ≤ $Ti^{4+}$ ≤ 25 cat %;
    press-molding the heated lens preform with a mold member; and
    releasing the molded lens preform from the mold member to form an optical element.

15. The method for producing an optical element according to claim 14, wherein the mold member has a release film on a surface that comes into contact with the lens preform.

16. The method for producing an optical element according to claim 14, wherein the release film is an amorphous carbon film.

* * * * *